United States Patent [19]

Baird et al.

[11] Patent Number: 5,218,696

[45] Date of Patent: Jun. 8, 1993

[54] METHOD FOR DYNAMICALLY EXPANDING AND RAPIDLY ACCESSING FILE DIRECTORIES

[75] Inventors: Robert Baird, San Jose, Calif.; Robert R. Berbec, New York, N.Y.; Gerald P. Bozman, Oakland, N.J.; Alexander S. Lett, Mahopac, N.Y.; James J. Myers, San Francisco, Calif.; William H. Tetzlaff, Mount Kisco; Jay H. Unger, Mohegan Lake, both of N.Y.

[73] Assignee: International Business Machines Corporation, Armonk, N.Y.

[21] Appl. No.: 946,829

[22] Filed: Sep. 17, 1992

Related U.S. Application Data

[63] Continuation of Ser. No. 384,582, Jul. 24, 1989, abandoned.

[51] Int. Cl.⁵ .............................................. G06F 15/40
[52] U.S. Cl. ............................ 395/600; 364/DIG. 1; 364/282.1; 364/282.2; 364/283.1; 364/280
[58] Field of Search ....................... 395/600, 650, 700

[56] References Cited

U.S. PATENT DOCUMENTS

| | | | |
|---|---|---|---|
| 3,400,371 | 9/1968 | Amdahl et al. | 340/172.5 |
| 4,255,796 | 3/1981 | Gabbe et al. | 364/900 |
| 4,318,184 | 3/1982 | Millett et al. | 364/900 |
| 4,611,272 | 9/1986 | Lomet | 364/200 |
| 4,611,298 | 9/1986 | Schuldt | 364/900 |
| 4,677,550 | 6/1987 | Ferguson | 364/300 |
| 4,893,232 | 1/1990 | Shimaoka et al. | 364/200 |
| 4,918,646 | 4/1990 | Hirose | 364/900 |

OTHER PUBLICATIONS

D. M. Ritchie and K. Thompson, "The Unix Time Sharing System", Bell System Technical Journal, vol. 57, pp. 1905-1929, Jul. 1978.
Deitel, "An Introduction to Operating Systems", Revised First Edition, copyright 1984 by Addison-Wesley Publishing Co., pp. 480-504.
Sedgewick, "Algorithms", Second Edition, copyright 1988 by Addison-Wesley Publishing Co., pp. 201-230.
Peterson and Silberschatz, "Operating Systems Concepts", Copyright 1983 by Addison-Wesley Publishing Co., Chapter 3, pp. 49-89.

Primary Examiner—Kevin A. Kriess
Attorney, Agent, or Firm—R. Bruce Brodie

[57] ABSTRACT

A computer-implemented method for the name-oriented accessing of files having at least zero records, any access path to files and records through an external store coupling the computer being defined by a pair of related directories. A first directory of record entries is sorted on a two-part token. The token consists of a unique sequence number assigned to the record and the sequence number of any parent record entry. Each record entry includes the token, file or record name, and external store address or pointer A traverse through the tokens constitutes a leaf-searchable B-tree. Rapid access to target records is by way of a name-sorted, inverted directory of names and tokens as a subset and which is reconstitutable from the first directory in the event of unavailability.

9 Claims, 2 Drawing Sheets

METHOD FOR DYNAMICALLY EXPANDING AND RAPIDLY ACCESSING FILE DIRECTORIES

This application is a continuation of application Ser. No. 07/384,582, filed Jul. 24, 1989, now abandoned.

FIELD OF THE INVENTION

This invention relates to CPU system-managed storage and, more particularly, to the dynamic management and rapid access of directory-based files and records located on an external store.

DESCRIPTION OF RELATED ART

To better appreciate the invention, the following paragraphs describe the UNIX tree-based file directory system, dynamic directories and their use with virtual systems, and related prior art.

UNIX Operating System

D. M. Ritchie and K. Thompson, "The UNIX Time Sharing System", Bell System Technical Journal, Vol. 57, pp. 1905-1929, Jul. 1978; and Deitel, "An Introduction to Operating Systems", Revised First Edition, copyright 1984 by Addison-Wesley Publishing Co., pp. 480-504, both describe UNIX as a CPU operating system designed originally as an application development environment with a command language and a device-independent file system. UNIX supports DASD files, directories, and special files.

UNIX Files

Unlike other operating systems, a UNIX file comprises a stream or sequence of bytes with a delimiter. This is otherwise known as a "flat file". That is, the file has no structure insofar as UNIX is concerned. Rather, any structure is controlled by the applications using the files. Device I/O transparency is achieved by treating device drivers as special files.

UNIX Directories

A UNIX directory provides a mapping between the names of files and the files themselves. Each application has a directory of files it can access. An application can create subdirectories. UNIX manages directory contents in a manner similar to that of an ordinary file except that the directory cannot be overwritten by unprivileged processes.

A UNIX directory entry contains only a name for the associated file and a pointed to the file itself. This pointer is an integer-valued index number (I-number). When the file is accessed, its I-number is used as an index into a system table containing a file description. The file description includes identification, length, last update, external storage addresses, and a code indicative of file type (ordinary file, directory, or special file). Significantly, the file descriptor associated with the I-number is of fixed capacity. Also, the capacity of the directory is so bounded that the I-number is susceptible to reuse or reassignment as file names change over a period of time.

Some UNIX File Operations and their Directory Relations

Files in UNIX are abstract data types over which the operations of CREATE, OPEN, READ/WRITE, and CLOSE are defined. A CREATE call is used to initiate a new file or rewrite an old one. For each OPEN file, the system maintains a pointer that indicates the next byte to be read or written. In this regard, OPEN informs the system that a file is about to become active, while CLOSE notifies the system that a file is no longer in active use.

In order to READ or WRITE a preexisting file, there must first be executed an OPEN call with the file name and an access type indication. The return responsive to the call is a system-assigned integer name used to designate the file with respect to all subsequent manipulations until it is subsequently subject to a CLOSE.

More particularly, the function of the CREATE and OPEN calls or operations prior to READ/WRITE is to translate the file name provided by the application into an I-number by searching NAME directories.

When a new file is created, an I-node is allocated for it and a directory entry is made containing the file name and the I-node number.

Once a file is opened, its device, I-number, and READ/WRITE pointer are stored in a system table indexed by the file descriptor (integer-valued number). During any subsequent READ/WRITE to the file, the I-number is used to access the file.

Dynamic Directory File Management and Demand Paging Virtual Store

Dynamic directory file management can be used in conjunction with demand paging virtual store. Such a virtual store is described in the copending application to Baird et al. U.S. Ser. No. 07/382,513, filed Jul. 19, 1989, "Method for Verification and Restoration of Directories in CPU Managed Stores."

Other Related Art

Sedgewick, "Algorithms", Second Edition, copyright 1988 by Addison-Wesley Publishing Co., pp. 201-230 discloses the use of B-trees as an expandable and amendable form of file directory wherein each node includes a record key value, the nodes being magnitude ordered in a predetermined manner to facilitate searching. Sedgewick varies the ordering to assure optimality as, for instance, supporting dynamic programming search algorithms.

Lomet, U.S. Pat. No. 4,611,272, "Key-accessed File Organization", issued Sep. 9, 1986, describes a two-level, index-oriented file. The index level accepts a vaying number of pages. Access to the pages is met by a hash computation rather than increasing the index size.

Ferguson, U.S. Pat. No. 4,677,550, "Method of Compacting and Searching a Data Index" issued Jun. 30, 1987, teaches that generating and saving relative magnitude pointers derived from keys associated with a leaf-oriented multiway search tree can shorten subsequent access paths to data as a function of the density of the derived pointers. In this regard, Ferguson associates the pointer and the record location for each successive pair of search keys.

Bozman, "Method for Obtaining Access to Data Structures Without Locking", copending patent application Ser. No. 07/255,000, filed Oct. 7, 1988, discloses a method for reading B-tree organized indices defined onto dynamic random access files without the use of locks. The leaf-searchable trees are organized such that all interior nodes include routing pointers and synchronization values. Central to the method is that of recursively comparing the synchronization values exhibited by each pair of contiguous hierarchically-spaced nodes within the subtree counterpart to a target node until either the target key has been obtained, the paths exhausted, or the method terminates.

SUMMARY OF THE INVENTION

It is an object of this invention to devise a method for the dynamic management and rapid access of directory-based files and records located on an external store.

It is a related object to devise a method which permits unlimited directory file or record changes without creating any dangling references.

It is still another object to devise a file directory management method in which related subdirectories may be recovered after corruption or other unavailability factors.

It is yet another object to devise a dynamic directory management method which may be used in conjunction with a demand paging virtual store.

It is a further object to devise a file directory management method having a construct operable as a surrogate for file names, aliases, or synonyms for lock management, file renaming, and other like purposes.

The foregoing objects are satisfied by a computer-implemented method for the name-oriented accessing of files having at least zero records. Any access path to files and records located on a CPU-coupled external store is defined by a pair of related directories. A first directory of record entries is sorted on a two-part token. The token consists of a unique sequence number assigned to the file/ record and the sequence number of any parent file/record entry. Each record entry includes at least the token, file or record name, and external store address or pointer. A traverse through the tokens constitutes a leaf-searchable B-tree.

Rapid access to target file/records operatively occurs by traverse of a name-sorted inverted directory of names and tokens. This second directory is a subset of the first directory. It is also immediately recoverable from the first directory in the event of corruption or unavailability due to storage media defects, write path failures, and the like.

By organizing the first directory into a leaf-searchable B-tree via the two-part token use, all new record entries to the first directory can be assigned sequence numbers not previously assigned. This avoids dangling references when entries are added or deleted since the numbers are not reused, as is the case in the UNIX prior art.

Significantly, the leaf-searchable B-tree organization of the first directory utilizes the two-part token and clusters related records or files together. Thus, when used in conjunction with a demand paging virtual store, paging activity is minimized through locality of referencing.

Advantageously, the token may be used as an argument to an operating system lock manager. Thus, a token-based lock to the file cannot be avoided even though the file may be accessed through other directory paths using aliases or synonyms to the original file name. Also, there is no difficulty in renaming a file since the token-based lock argument for the file remains the same.

DESCRIPTION OF THE PREFERRED EMBODIMENT

The Host CPU Environment for Executing the Method of the Invention

The invention can be conveniently practiced in a general purpose computer such as an IBM/360 or 370 architected CPU having the IBM MVS operating system. An IBM/360 architected CPU is fully described in Amdahl et al., U.S. Pat. No. 3,400,371, "Data Processing System", issued Sep. 3, 1968.

An MVS operating system (OS) is set out in IBM GC28-150, "MVS/Extended Architecture System Programming Library: System Macros and Facilities", Vol. 1. Details of standard MVS or other operating system services such as lock management, subsystem invocation by interrupt or monitor, and the posting and waiting of tasks is omitted. These OS services are believed well appreciated by those skilled in the art.

An Illustrative Example

Applications executing upon a CPU make references or calls to files and their substituent records using arbitrary, fanciful, or suggestive names. These are processed by the operating system making necessary references to directories and subdirectories to define the path of interest.

It should be appreciated that details of the operating system's response to I/O references by way of tree-structured directories are well known and are described in such standard works as Peterson and Silberschatz, "Operating System Concepts", copyright 1983 by Addison-Wesley Publishing Co., chapter 3 on file management systems, pp. 49-89; and Amdahl (referenced above).

It should be further appreciated that the formal properties of storage directory constructs such as leaf-searchable B-trees are fully described by the aforementioned Sedgewick and Bozman references.

Figure 1:
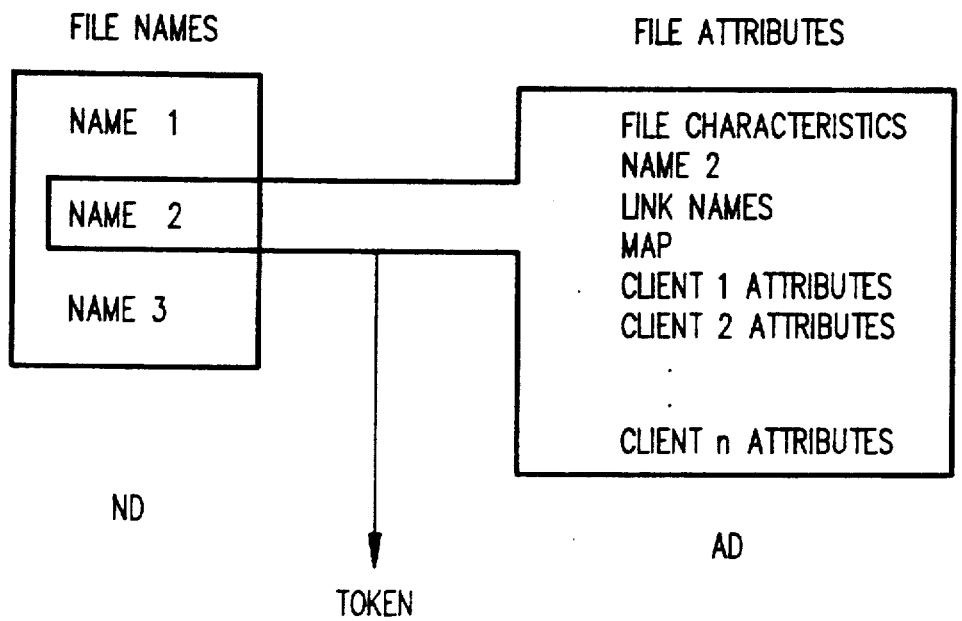
FIG. 1 depicts the use of the token as the key coupling the name directory ND and its attribute directory AD counterpart.

Referring now to FIG. 1, there is depicted the use of the token as the key coupling the name directory ND and its attribute directory AD counterpart. In this regard, the name directory is a name-sorted concordance of <NAME><TOKEN>, while the so-called attribute directory is a token-sorted concordance of at least <TOKEN><NAME><TOKEN OF DIRECTORY CONTAINING NAME><EXTERNAL STORAGE ADDRESS/ POINTER>. Utility of the attribute directory is increased if fields of attributes are added. Typical attributes include the file length, number of substituent records, date of file creation, date of last update, etc.

Clearly, the name directory is a sorted subset of the attribute directory. It may be easily replaced by executing a sort operation on the attribute directory in the event of corruption due to media defect, write path error, or the like.

Reference should again be made to Baird et al, U.S. Ser. No. 07/382,513, filed Jul. 19, 1989, "Method for Verification and Restoration of Directories in CPU Managed Store" wherein portions of attribute file map entries are appended to counterpart data blocks as suffixes and indivisibly stored. If the token as described were included as part of the suffix so recorded with each data block, then recovery of the names directory would be substantially enhanced in the event that both the attribute and names directories became corrupted, erased, or otherwise unavailable.

According to Baird et al., the attribute map would be reconstructed from a sort and collation on the suffixes of the data blocks. As may be recalled, the token includes a file reference (unique sequence number) and a parent file reference. An attribute map reconstructed from suffixes including tokens would permit recovery of name directories. This takes advantage of the fact that the tokens identify the parent files from which the directory tree can be constructed.

Figure 2:
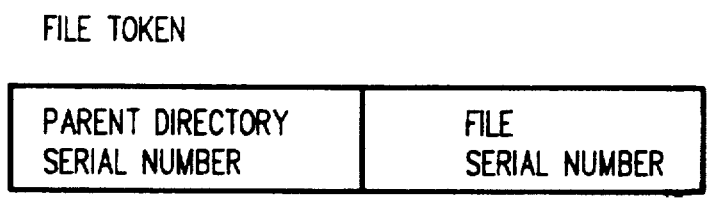
FIG. 2 illustrates the two-part token formed from a file or record sequence number and the sequence number of a parent record or file thereof.

Referring now to FIG. 2, there is shown the token format. Actually, it is the essence of simplicity. It is formed from an ordered pair of sequence numbers assigned by an internal counter. The ordered pair comprises <serial number of parent file> <serial number of new file>. The serial or sequence number assigned to each new file entry is unique and has not been assigned to any other directory entry.

Figure 3:
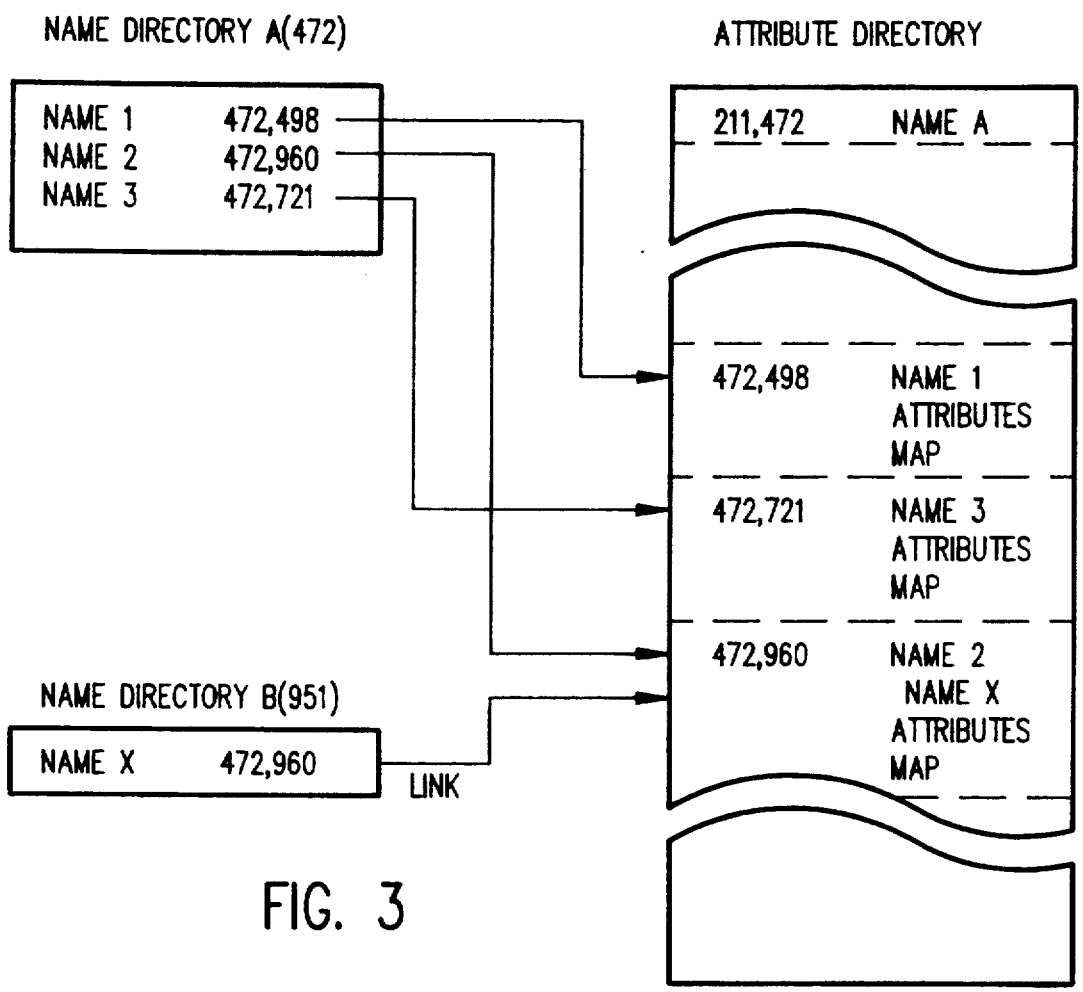
FIG. 3 sets forth an example of the token-sorted attribute directory and its name-sorted name directory fast path access thereto.

Referring now to FIG. 3, there is shown a pair of name directories in access relation to the attribute directory. The attribute directory entries are arranged according to a two-way sort on the token fields. The primary sort field is the sequence number assigned to the parent file, and the secondary sort fields are the new file sequence numbers. Note, this produces the beneficial clustering in the attribute directory of all files having the same parent record. This is exemplified by parent file number 472 having the new file entries 498, 721, and 960 clustered therearound. The benefit arises from the locality of referencing when used with any LRU-managed cache or demand paging system.

As should now be apparent, it is the use of the ordered number pairs as the token keys relating antecedent and descendent files which renders a leaf-searchable B-tree traverse through the attribute directory possible. The B-tree construct permits the near infinite expansion of adding and deleting files to the directory using only new sequence numbers.

The B-tree construct avoids the dangling references as is occasioned by the reuse of I-numbers in UNIX. That is, in this invention when file 472 is deleted, the number "472" is never again assigned to a new directory file entry. When an application references the name associated with file 472, a read error will be returned. In the prior art, it was the reuse or reassignment of the same number to a different file while failing to erase at least one of the previous links associated with that number that resulted in the failure to reuse memory space in the UNIX system. This devolved from the fact that prior art systems would indicate the number of links associated with a file, but would not provide information as to their location. Consequently, the integrity problem was built into their file directory management.

Operatively, there are several steps comprising the method of this invention. Initially, a first directory is formed as a concordance of record entries sorted on a unique sequence number as the first field of an ordered pair of fields. Each record entry includes the ordered pair, record or file name, and external address or pointer fields. The second number of the ordered pair is the same as the unique sequence number assigned to a parent record or file of the record entry. A traverse through said ordered pairs constitutes a leaf-searchable B-tree.

The next step is that of forming a second directory from the first directory as a name-sorted concordance of names and ordered pairs. After this, any target records are accessed by establishing a leaf-searchable B-tree path through said second and first directories responsive to a file or record name as a search argument.

Significantly, it is the use of the names directory which provides the fast access into the attribute directory. It is also the case that the invention may be extended to the use of any attribute-sorted directory of <attribute> <token> pairs as a fast access into the attribute directory without departing from the spirit and scope thereof.

We claim:

1. In a system including a CPU and an external store, said external store having resistant thereon files of records and directories, said CPU having an operating system (OS), internal storage, and means including the OS and internal storage for establishing an access path to said files, records, and directories on the external store, a method for attribute oriented accessing of files having at least zero records, each record having at least one field, any access path from the CPU to files and records on said external store being defined by at least one directory, comprising the steps of:

(a) forming a first directory of records by said OS in internal storage and copied to said external store, in which each record entry includes a token, attributes, and an external storage address or pointer thereto, each token comprising a unique identifier for the record entry and a unique identifier for any parent file or record of the record entry, said entries being arranged in token sorted order, traverse of said tokens constituting a leaf search B-tree, the identifiers constituting each token being members of an infinite set such that when once the token is removed from the directory the token is never repeated;

(b) forming a second directory from said first directory by said OS in internal storage and copied to said external store, each entry including a predetermine attribute (e.g. record name) and a counterpart token, said entries being arranged in the second directory in predetermined attribute sorted order; and (c) responsive to a selected instance of the predetermined attribute as a search argument, accessing target records by way of a leaf searchable path through the second and first directories conducted by the OS in internal storage and the accessing means.

2. The method according to claim 1, wherein said method further comprises the steps of:

(d) in the event of the unavailability of the second directory such as occasioned by external store media or write path failures, deriving said second directory from the first directory by said OS executing a sort in internal storage as a predetermined attribute oriented sorted subset thereof.

3. The method according to claim 1, wherein the second directory constitutes an inverted directory subset derived from the first directory.

4. The method according to claim 1, wherein the predetermined attribute is the record for file name, and further wherein the number tokens being very large relative to the number of names, and still further wherein tokens are associated only once with each record entry and never associated with any other record entry.

5. In a system including a CPU and an external store having resident thereon files of records and directories, said CPU having an operating system (OS), internal storage, and means including the OS and internal storage for establishing an access path to the files, records, and directories on the external store, a method for the name oriented accessing of files having at least zero records, each record having at least one field, each parent record or file having a unique sequence number assigned thereto, any access path from the CPU to files and records on said external store being defined by at least one directory, comprising the steps of:

(a) forming a first directory of record entries by said OS an internal storage and copied to said external store said record entries being sorted on a unique sequence number as the first field of an ordered pair of fields, each record entry including the ordered pair, record or file name, and external address or pointer fields, the second number of the ordered pair being the same as the unique sequence number assigned to a parent record or file of the record entry, a traverse through said ordered pairs constituting a leaf searchable B-tree, the ordered pair constituting each token being members of an infinite set such that when once the token is removed from the directory the token is never repeated;

(b) forming a second directory from the first directory by said OS in internal storage and copied to said external store, each entry including a name and an ordered pair, said entries being arranged in the second directory in name sorted order;

(c) responsive to a selected instance of a file or record name as a search argument, accessing any target records by establishing a leaf searchable B-tree path through said second and first directories as conducted by the OS in internal storage and the enclosing means; and (d) assigning a unique sequence number by the OS, not previously assigned, responsive to causing any new record entry to be made in the first directory.

6. In a system including a CPU and an external store having resident thereon files of records and directories, said CPU having an operating system (OS), internal storage, and means including the OS and internal storage for establishing an access path to the files, records, and directories on the external store, a space efficient method for the name oriented accessing of files having key based variable length records using at least one directory, comprising the steps of:

(a) forming a leaf search B-tree organized key or storage location directory of records and their descriptive attributes by said OS in internal storage and copied to said external store, and, expanding, populating, and amending said directory responsive to a write access, said attribute directory having a domain relatively infinite to the domain of keys, each key including a unique identifier for a counterpart record and a unique identifier for any parent file or record, the identifiers constituting each key being members of an infinite set such that when once the token is removed from the directory the token is never repeated;

(b) forming from said attribute directory of a leaf search B-tree organized directory of names or pointers to said attribute directory entries, said name directory being formed by the OS in internal storage and copied to said external store; and (c) responsive to a selected instance of a file name, accessing target records by establishing a leaf search path through the name and attribute directories as conducted by the OS in internal storage and the accessing means.

7. The method according to claim 1 or to claim 5, wherein the OS further includes a lock manager for restricting access to a file by imposing a lock thereon responsive to a read or write access request matching a file attribute defining lock status, and wherein said method comprises the further step of, during execution of an access request and upon ascertaining the lock status of a named file, furnishing the token as a surrogate argument to the lock manager and causing said lock manager to impose a token based rather than a file name, alias, or synonym based lock instead.

8. The method according to claim 1 or claim 5, wherein said method further includes the steps of effectuating recovery of said first directory by the OS in internal storage by duplicating at least a portion of each directory file entry, appending the duplicated portion to the counterpart file as a suffix, indivisibly recording the file and the suffix in the external store, and in the event of unavailability of the first directory, at least partially reconstructing said unavailable first directory by sorting and collating the suffix portions of the files, causing each first directory entry to include a token as an attribute thereof, and further causing said token included suffix to be appended and recorded with each counterpart file in external store indivisibly; and recovering said second directory from said first directory by scanning the parent identifier and constructing a directory structure therefrom and from the attribute part of each file entry by the OS in internal storage.

9. The method according to claim 1 or claim 5, wherein said CPU includes means for effectuating recovery of said first directory by duplicating at least a portion of each directory file entry, appending the duplicated portion to the counterpart file as a suffix, indivisibly recording the file and the suffix in the external store, and in the event of map unavailability, at least partially reconstructing said map or directory by sorting and collating the suffix portions of the files, and wherein said method comprises the further steps of:

causing each map entry to include a token as an attribute thereof, and further causing said token included suffix to be appended and recorded with each counterpart file in external store indivisibly; and recovering said second directory from said first directory by scanning the parent identifier and constructing a directory structure therefrom and from the attribute part of each file entry.

* * * * *